(12) United States Patent
Kataja

(10) Patent No.: US 9,532,417 B2
(45) Date of Patent: Dec. 27, 2016

(54) METHOD AND CONVERTER FOR SUPPLYING CURRENT TO SERIES CONNECTION OF LEDS

(71) Applicant: TEKNOWARE OY, Lahti (FI)

(72) Inventor: Jari Kataja, Lahti (FI)

(73) Assignee: TEKNOWARE OY, Lahti (FI)

( * ) Notice: Subject to any disclaimer, the term of this patent is extended or adjusted under 35 U.S.C. 154(b) by 33 days.

(21) Appl. No.: 14/595,994

(22) Filed: Jan. 13, 2015

(65) Prior Publication Data

US 2015/0201473 A1    Jul. 16, 2015

(30) Foreign Application Priority Data

Jan. 15, 2014    (FI) ...................................... 20145027

(51) Int. Cl.
*H05B 33/08* (2006.01)
*H02M 3/156* (2006.01)

(52) U.S. Cl.
CPC ......... *H05B 33/0815* (2013.01); *H02M 3/156* (2013.01); *H05B 33/0818* (2013.01); *H05B 33/0821* (2013.01)

(58) Field of Classification Search
None
See application file for complete search history.

(56) References Cited

U.S. PATENT DOCUMENTS

| 7,276,861 B1* | 10/2007 | Shteynberg | H02M 3/157 315/224 |
| 2009/0167200 A1* | 7/2009 | Brokaw | H02M 1/36 315/224 |
| 2011/0309760 A1* | 12/2011 | Beland | H02M 1/4258 315/201 |
| 2012/0043902 A1 | 2/2012 | Kanamori et al. | |
| 2012/0049755 A1 | 3/2012 | Shimizu et al. | |
| 2013/0076252 A1* | 3/2013 | Shao et al. | 315/186 |
| 2013/0119868 A1 | 5/2013 | Saxena et al. | |

FOREIGN PATENT DOCUMENTS

| CN | 203327330 U | 12/2013 |
| TW | 201304597 A1 | 1/2013 |

OTHER PUBLICATIONS

Lin et al., "Optimal LED Array Combination for Dual-loop CCM Boost Driver", Industry Applications Society Annual Meeting (IAS), 2012, pp. 1-9.
"4.5-V to 52-V Input Current Mode Boost Controller," Texas Instruments, TPS40210, TPS40211, SLUS772B-Mar. 2008, Revised Jun. 2008, pp. 1-46.
"LED Driver Boost Converter," ZETEX, ZXSC400, Issue 1, Jan. 2003, p. 1-17.
"TPS61500 3-A Boost Converter for High Brightness LED Driver with Multiple Dimming Methods," Texas Instruments, TPS61500, SLVS893C-Dec. 2008, Revised Jul. 2015, p. 1-30.

* cited by examiner

*Primary Examiner* — Crystal L Hammond
(74) *Attorney, Agent, or Firm* — Birch, Stewart, Kolasch & Birch, LLP

(57) ABSTRACT

The present disclosure describes a boost converter for supplying current to a series connection of light-emitting diodes (LEDs). A duty ratio of the main switch of the converter is configured to be controlled on the basis of a current feedback signal. The current feedback signal is formed as a weighted average of at least two signals including a first signal representing the current through the series connection of LEDs and a second signal representing a current through the main switch.

4 Claims, 1 Drawing Sheet

METHOD AND CONVERTER FOR SUPPLYING CURRENT TO SERIES CONNECTION OF LEDS

FIELD OF THE INVENTION

The present invention relates to power supplies, and particularly to controlling the current of series-connected light emitting diodes (LEDs).

BACKGROUND INFORMATION

When supplying power to a series connection of LEDs, achieving a stable current or power through the series connection is typically desirable. Conventionally power supplies for LEDs are implemented as buck converters, in which the current through the LEDs is determined by measuring a current through the main switch of the converter. When using a buck converter, however, the number of LEDs in series may be limited by the input voltage of the converter. At low input voltages, only a few LEDs can be connected in series.

In order to have more LEDs in series even at low input voltages, a boost converter may be used for driving the series connection. Control of a main switch of a boost converter may be implemented by using a dedicated pulse-width modulation (PWM) controller IC. The controller controls the main switch to conductive and non-conductive states in such a duty ratio that a desired output current is generated.

The controller IC may include a comparator configured to limit current through the main switch, for example. The current limiting function may operate by limiting the duty ratio of the PWM of the main switch. The ICs may also include a comparator for limiting the output voltage. If the output voltage is too high, the comparator may disable the PWM until the output voltage decreases to an acceptable level, for example.

Determining the current through the LEDs in a boost converter is not as simple as in a buck converter, since the output voltage also affects the current of the main switch. Instead, the current through the LEDs may be determined more directly by using a measurement resistor in series with the LEDs.

However, the level of internal reference voltage(s) for the comparator(s) is typically around 1.25 V. Thus, the feedback signal representing the measured current may have to be at this level. Such a voltage over the current measurement resistor may lead to significant power losses in the resistor.

In order to avoid excessive power losses in the measurement resistor, a measurement with a smaller resistance may be used and the voltage over the measurement resistor may be amplified. FIG. 1 shows an exemplary boost converter, where the measured voltage is amplified by using an operational amplifier. The boost converter is used to drive a series connection of LEDs 10. The main switch $Q_1$ of the converter is controlled by a PWM controller IC $U_1$. The controller $U_1$ comprises a comparator and an internal reference voltage $V_{ref}$.

In FIG. 1, the voltage over a current measurement resistor $R_1$ is amplified by using an amplifying circuitry 11 comprising an operational amplifier $U_2$. The amplifying circuitry 11 also acts as a low-pass filter for the measured voltage. The circuitry 11 brings the current measurement to a voltage level that can be used in the controller $U_1$. However, this implementation requires the use of relatively complex circuitry comprising a sufficiently accurate operational amplifier, which may make the implementation less cost-effective.

BRIEF DISCLOSURE

An object of the present invention is to provide a method and a converter implementing the method so as to alleviate the above disadvantages. The objects of the invention are achieved by a method and a converter which are characterized by what is stated in the independent claims. The preferred embodiments of the invention are disclosed in the dependent claims.

The method of the present disclosure uses a boost converter for controlling a current through series-connected LEDs. A robust current feedback signal may be formed by combining two measurements: a measurement of the main switch current and a measurement of the LED string current. The currents may be measured as voltages over current measurement resistors.

The measured voltages may be combined by connecting them to a common point through resistors. The voltage at the common point represents a weighted average of the measured voltages and may be used as the current feedback signal. The resistances of the current measurement resistors form weighting factors for the formed average. The weighted average may also comprise a constant voltage term that raises the formed value of the average and, thus, allows lower resistances of the current measurement resistors to be used.

The present disclosure describes a simple and robust implementation for controlling output current. The current feedback signal may be formed without amplification of the output current measurement signal. Thus, no operational amplifier is required.

BRIEF DESCRIPTION OF THE DRAWINGS

In the following the invention will be described in greater detail by means of preferred embodiments with reference to the attached drawings, in which.

DETAILED DISCLOSURE

Figure 1:
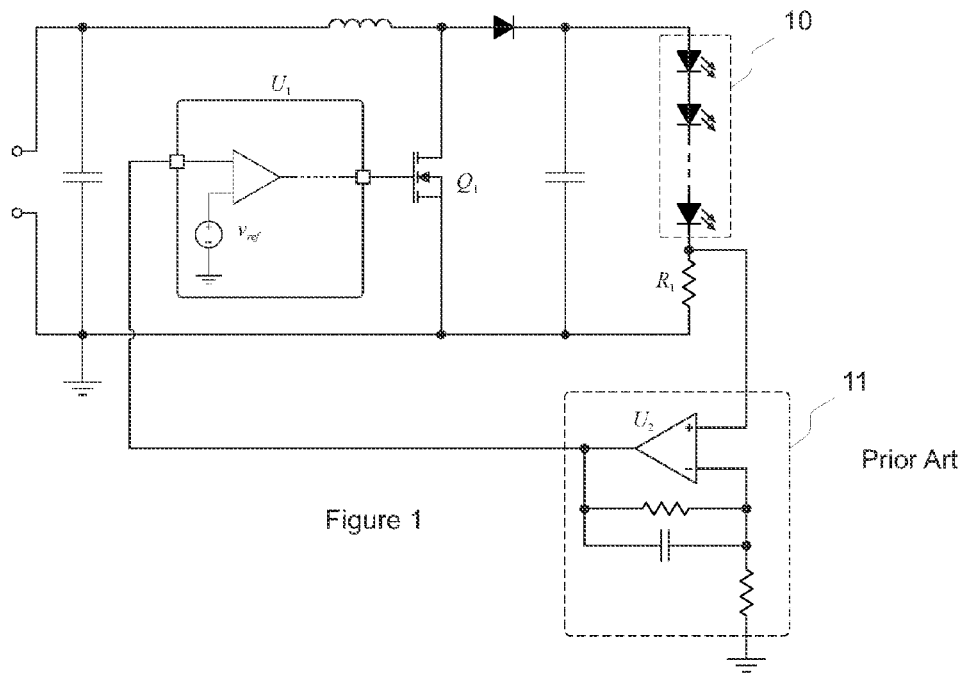
FIG. 1 shows an exemplary boost converter, where the measured voltage is amplified by using an operational amplifier.

The present disclosure describes a method for controlling a boost converter that supplies current to a series connection of light-emitting diodes (LEDs). The boost converter may comprise a series connection of a main inductance and a main switch between the supply terminals. A series connection of a main diode and a load (i.e. the LEDs) may be connected in parallel with the main switch and, thus, form an alternative route for the current through the main inductor when the main switch is non-conducting.

In the method, the switching state of a main switch may be controlled on the basis of a feedback signal that is a weighted average of at least two signals including a first signal representing the current through the series connection of the light-emitting diodes and a second signal representing a current through a main switch of the boost converter. The first signal may be measured as a voltage over a first measurement resistor in series with the LEDs. The second signal may be measured as a voltage over a second measurement resistor in series with the main switch.

During a conducting state of the main switch, the current through the main switch and the main inductor increases linearly. Thus, the second signal has a sawtooth shape. The first signal may be a DC current at a desired level.

A weighted average of these signals is still sawtooth-shaped but now has a constant offset and a lower peak-to-peak amplitude than the second signal. The level of the offset depends on the first signal, i.e. on the current through the LED string. Thus, a duty ratio of the main switch may be controlled on the basis of the feedback signal. The formed current feedback signal may be supplied to an input of a PWM controller IC limiting the duty ratio, for example. The controller IC may comprise a comparator that compares a current measurement with a reference level, and if the level is exceeded, limits the duty ratio by switching the main switch off.

By increasing the level of the second signal (i.e. the voltage over the second measurement resistor), the level of the first signal (i.e. the voltage over the first measurement resistor) may be reduced while maintaining the same level of the weighted average.

To further reduce the measurement voltage of the current through the LEDs, the weighted average may further comprise a constant voltage term. In the weighted average, a constant voltage term that is higher than the reference level of the comparator allows the use of lower signal levels for the first signal and the second signal.

The present disclosure also describes a boost converter for supplying current to a series connection of light-emitting diodes. The boost converter implements the method of the present disclosure.

A duty ratio of a main switch of the boost converter may be configured to be controlled on the basis of a current feedback signal. The converter may comprise a control IC that controls the duty ratio on the basis of a comparison between the feedback signal and a reference level.

In the boost converter of the present disclosure, the current feedback signal may be formed as a weighted average of at least two signals including a first signal representing the current through the series connection of LEDs and a second signal representing a current through the main switch. The weighted average may be formed by connecting the first and second signals to a common point through resistors, for example. Inverse values of the resistances of the resistors can be considered to represent weighting coefficients of the weighted average. The weighted average formed in this manner may further include a constant voltage term formed by a voltage reference, for example.

Figure 2:
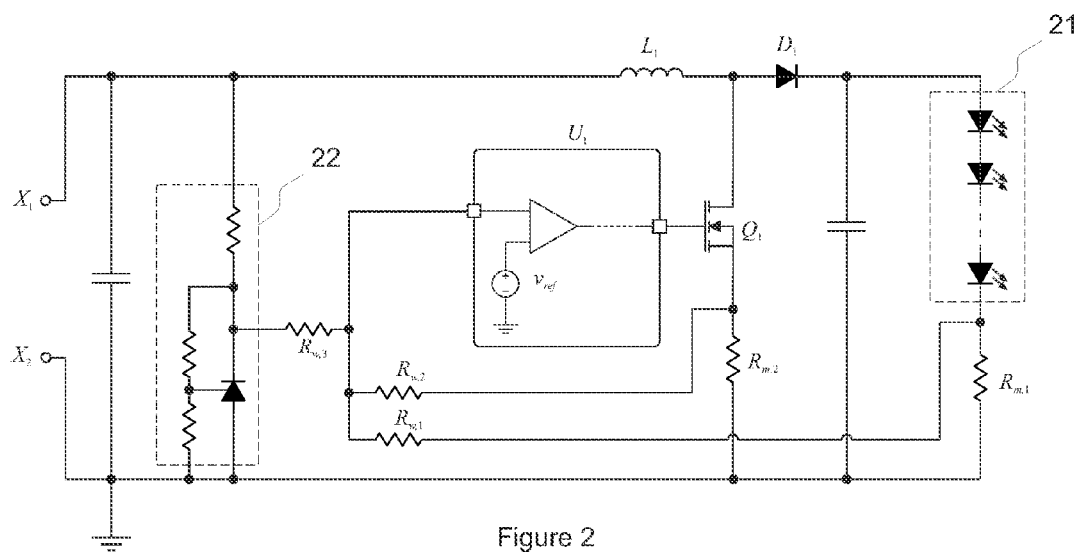
FIG. 2 shows an exemplary embodiment of the method of the present disclosure.

FIG. 2 shows an exemplary embodiment of the method of the present disclosure. The boost converter in FIG. 2 comprises a series connection of a main inductance $L_1$ and a main switch $Q_1$ between the supply terminals $X_1$ and $X_2$. The main switch $Q_1$ may be a MOSFET or a BJT, for example. A series connection of a main diode $D_1$ and LEDs 21 is connected in parallel with the main switch $Q_1$ and, thus, form an alternative route for the current through the main inductor $L_1$ when the main switch $Q_1$ is non-conducting.

The boost converter supplies current to the series connection of LEDs 21. A duty ratio of the main switch $Q_1$ is configured to be controlled on the basis of a current feedback signal. In FIG. 2, a PWM controller IC $U_1$ receives the current feedback signal and drives the gate of the switch $Q_1$ on the basis thereof. Only two terminals of the controller $U_1$ are shown.

The controller $U_1$ controls the switch to a non-conductive or conductive state on the basis of a comparison between the control feedback signal and a reference voltage $v_{ref}$. In FIG. 2, the reference voltage $v_{ref}$ is generated inside the controller $U_1$.

The current feedback signal in FIG. 2 is formed as a weighted average of a first signal representing the current through the series connection of LEDs and a second signal representing a current through the main switch. The first signal is a voltage over a first measurement resistor $R_{m,1}$ in series with the LEDs 21. The second signal is a voltage over a second measurement resistor $R_{m,2}$ in series with the main switch $Q_1$.

The weighted average is formed by connecting the first signal and the second signal to a common point through weighting resistors $R_{w,1}$ and $R_{w,2}$. The voltage at the common point may be used as the current feedback signal. The weighting resistors $R_{w,1}$ and $R_{w,2}$ may be selected such that changes in the current through the LEDs have more effect on the average than changes in the current through the main switch.

In order to further decrease the levels of the first and second signals, the weighted average in FIG. 2 may further include a constant voltage formed by a voltage reference. In FIG. 2, a voltage reference circuitry 22 generates a constant voltage that is supplied to the common point through a resistor $R_{w,3}$.

It is obvious to a person skilled in the art that the inventive concept can be implemented in various ways. The invention and its embodiments are not limited to the examples described above, but may vary within the scope of the claims.

The invention claimed is:

1. A boost converter for supplying current to a series connection of light-emitting diodes, wherein
   the boost converter comprises a main switch, and
   a duty ratio of the main switch is configured to be controlled on the basis of a current feedback signal, wherein
   the current feedback signal is formed as a weighted average of at least two signals including a first signal representing the current through the series connection of LEDs and a second signal representing a current through the main switch.

2. The boost converter according to claim 1, wherein
   the first signal is a voltage over a first resistor in series with the LEDs,
   the second signal is a voltage over a second resistor in series with the main switch, and
   the weighted average is formed by connecting the first signal and the second signal to a common point through resistors, wherein a voltage at the common point represents the weighted average.

3. The boost converter according to claim 2, wherein the weighted average further includes a constant voltage formed by a voltage reference.

4. A method for controlling a boost converter supplying current to a series connection of light emitting diodes, wherein the method comprises
   forming a current feedback signal as a weighted average of at least two signals including a first signal representing the current through the series connection of the light-emitting diodes and a second signal representing a current through a main switch of the boost converter, and
   controlling a duty ratio of the main switch on the basis of the current feedback signal.

* * * * *